United States Patent
Ozawa

Patent Number: 6,104,309
Date of Patent: Aug. 15, 2000

[54] ANTI-THEFT SYSTEM FOR AUTOMOTIVE ELECTRONIC ACCESSORY WITH CODED INTERLOCK

[75] Inventor: Minoru Ozawa, Iwaki, Japan

[73] Assignee: Alpine Electronics Inc., Japan

[21] Appl. No.: 08/198,671

[22] Filed: Feb. 18, 1994

Related U.S. Application Data

[63] Continuation of application No. 07/811,441, Dec. 19, 1991, abandoned, which is a continuation-in-part of application No. 07/629,783, Dec. 17, 1990, abandoned.

[30] Foreign Application Priority Data

Dec. 15, 1989 [JP] Japan .................................... 1-325593

[51] Int. Cl.[7] .................................................. H04Q 1/00
[52] U.S. Cl. .............................. 340/825.31; 340/825.69; 340/693; 340/568
[58] Field of Search ...................... 340/825.31, 825.32, 340/825.69, 426, 568, 691, 693

[56] References Cited

U.S. PATENT DOCUMENTS

| | | |
|---|---|---|
| 4,383,242 | 5/1983 | Sassover et al. . |
| 4,638,293 | 1/1987 | Min .......................................... 340/693 |
| 4,679,026 | 7/1987 | Knakowski .............................. 340/568 |
| 4,691,801 | 9/1987 | Mann ...................................... 307/10.2 |
| 4,754,255 | 6/1988 | Sanders .............................. 340/825.31 |
| 4,791,420 | 12/1988 | Baba . |
| 4,794,268 | 12/1988 | Nakano .................................. 307/10.2 |
| 4,866,417 | 9/1989 | DeFino et al. . |
| 4,897,630 | 1/1990 | Nykerk . |
| 4,908,604 | 3/1990 | Jacob . |
| 4,987,406 | 1/1991 | Reid . |
| 5,021,765 | 6/1991 | Morgan . |
| 5,077,548 | 12/1991 | Dipoala . |
| 5,160,914 | 11/1992 | Sato . |

FOREIGN PATENT DOCUMENTS 2051442  1/1981  United Kingdom .............. 340/825.69

*Primary Examiner*—Brian Zimmerman
*Attorney, Agent, or Firm*—Brinks Hofer Gilson & Lione

[57] ABSTRACT

An anti-theft system for an automotive electronic accessory, such as an automotive audio device, has a security device including a sensor for sensing any abnormal state of the electronic accessory, a siren, and a remote control unit for controlling arming and disarming of the system. The system also includes the electronic accessory itself, which is enabled to operate only when a predetermined code is input thereto after turning on its electrical power supply. The predetermined code is input to the electronic accessory through the security device in response to the arming or disarming command from the remote control unit.

4 Claims, 4 Drawing Sheets

ANTI-THEFT SYSTEM FOR AUTOMOTIVE ELECTRONIC ACCESSORY WITH CODED INTERLOCK

RELATED APPLICATIONS

This application is a Continuation of U.S. application No. 07/811441 filed Dec. 19, 1991 now abandoned, which is a Continuation In Part of U.S. application No. 07/629783 filed Dec. 17, 1990 now abandoned.

BACKGROUND OF THE INVENTION

1. Field of the Invention

The present invention relates to an security device for preventing theft of automotive electronic accessories such as, for example, an electronic audio device used in an automobile.

2. Description of the Prior Art

An anti-theft system of the type mentioned above is known in which the system is activated when an electronic audio device is removed from the automobile, so that only the owner can remove the device and take it with him. In order to replace the audio device again in the automobile so it is operative, the owner inputs a predetermined code to the audio device via input keys.

However, owners who remove the audio device often forget the codes, thus failing to make the audio device operative after replacing it in the car. Also, the code is not completely unbreakable, so that someone who has stolen the audio device may undesirably succeed in putting the device into operation.

SUMMARY OF THE INVENTION

Accordingly, an object of the present invention is to provide an anti-theft system for an automotive electronic accessory which enables input of a predetermined code to the electronic accessory through an security device by a remote control.

Another object of the present invention is to provide an anti-theft system for an automotive electronic accessory which does not require the owner to remember a code.

To these ends, according to one aspect of the present invention, an anti-theft system for an automotive electronic accessory comprises a security device including a sensor for sensing any abnormal state of the electronic accessory, a siren and a remote control unit for controlling initiation and termination of the arming operation; and the electronic accessory enabled to operate only when a predetermined code is input thereto after turning on the electrical power supply, whereby the predetermined code is input to the electronic accessory through the security device in response to operation of the remote control unit.

In the anti-theft system of the present invention, the user can input a predetermined code to an electronic accessory through a remote control unit by operation of a single key, and the electronic accessory becomes operative only when the input code coincides with the resident code.

The above and other objects, features and advantages of the present invention will be clear from the following description of the preferred embodiments in conjunction with the accompanying drawing.

DESCRIPTION OF THE PREFERRED EMBODIMENT

Figure 1:
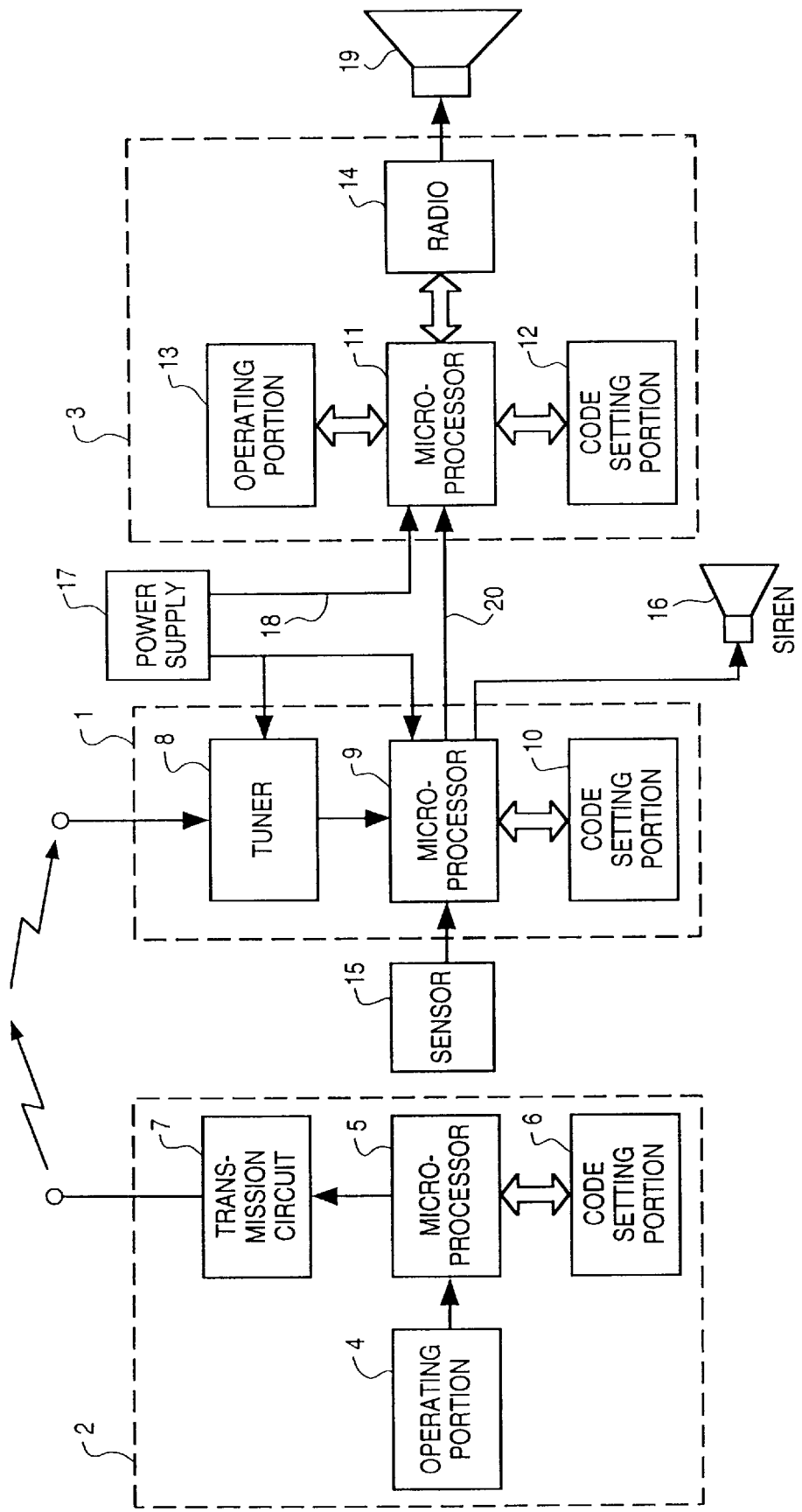
FIG. 1 is a block diagram of an embodiment of the present invention.

Referring to FIG. 1, a main unit 1 of an automotive security device has a tuner 8 for receiving a radio signal, a code setting portion 10, and a programmable microprocessor 9 for controlling the tuner 8 and the code setting portion 10. The microprocessor 9 activates a siren 16 in the event of detection of any abnormality by a sensor 15 which may be a motion sensor.

Figure 2:
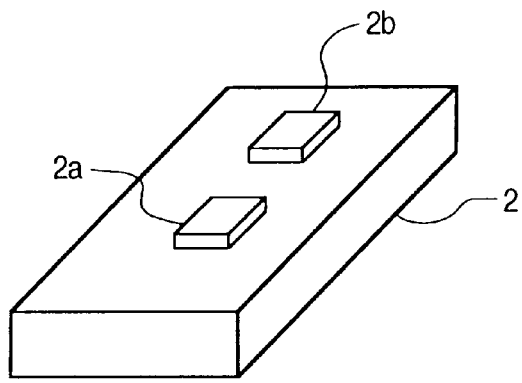
FIG. 2 shows the remote control.

The automotive security device also has a remote control unit 2 (see FIG. 2 showing exterior thereof) for remote control of the main unit 1. The remote control 2 (see FIG. 1) has an operating portion 4 for entering instructions by means of two keys which are an arming key 2a and a disarming key 2b, a code setting portion 6, a transmission circuit 7 for transmitting a radio signal representing the set code, and a non-programmable microprocessor (a microcontroller) 5 serving as a controller. Command codes (arm and disarm) as well as a predetermined code (ID code) are stored in the code setting portion 6, for instance, in a ROM (read only memory). When a user operates one of the keys 2a, 2b in the remote control unit, the microprocessor 5 in the remote control unit 2 reads out the ID code and a command code, i.e., arm or disarm in response to the key operation, and the command code with the associated ID code is conventionally modulated using well known radio frequency techniques and transmitted by radio by the transmission circuit 7. The main unit 1, sensor 15 and the siren 16 in cooperation are an automotive security device.

An automotive audio device 3 is, in the illustrated embodiment, a radio receiver system physically detachable from unit 1. The audio device 3 has an operating portion 13 for providing operation instructions, a radio receiver 14, a code setting portion 12, and a programmable microprocessor 11 serving as a controller for controlling these components. The microprocessor 11 of the audio device 3 is connected to the microprocessor 9 of the main unit 1 by a communication line 20. The microprocessors 9, 11 and other components of the system as shown are supplied with electrical power from a power supply 17 of the automobile. A speaker 19 produces an audible signal from a radio receiver 14. Thus, the anti-theft system for an automotive electronic accessory of the present invention includes two parts: namely, an automotive security device including the main unit 1 and the remote controller 2; and the automotive audio device 3.

Operation of the anti-theft system for an automotive audio device is as follows.

Once the line 18 from the power supply 17 is disconnected due to removal of the automotive audio device 3 from its predetermined mounting space in the automobile, the microprocessor 11 operates such that the audio device 3 does not operate unless a predetermined code, which is the same as that resident in the code setting portion 12 of the automotive audio device 3, is input to the microprocessor 11 even when the audio device 3 is replaced and line 18 from the power supply 17 is connected again. Thus, the user is required to perform the following procedure for enabling the audio device 3 to operate it after replacing it. In the first step, the user operates one of the two keys 2a, 2b on the operating portion 4 of the remote control 2 to input an instruction (arming or disarming) for setting the audio device 3 to its operative state. Upon sensing this arming or disarming instruction, the microprocessor 5 transmits, through the transmission circuit 7, a radio signal carrying a command signal (arm or disarm) and also includes the predetermined code resident in the code setting portion 6. The radio signal is received by the tuner 8 in the main unit 1 and the microprocessor 9 compares the code contained in the received radio signal with a predetermined code resident in the code setting portion 10. The microprocessor 9 allows the main unit 1 to arm or disarm in accordance with the command signal only when the code contained in the received command signal coincides with the code resident in the code setting portion 10. Thus, the microprocessor 9 delivers a signal representing a predetermined code to the microprocessor 11 of the audio device 3 through the communication line 20 when the coincidence is obtained between the code contained in the received command signal and the code resident in the code setting portion 10 of the main unit 1. Upon receipt of this signal, the microprocessor 11 of the automotive audio device 3 compares the code contained in the signal sent from the microprocessor 9 of the main unit 1 of the anti-theft device with a code which is resident in the code setting portion 12. The microprocessor 11 then enables the operating portion 13 and the radio receiver 14 to operate only when coincidence is obtained between these codes. Thus, the audio device 3 cannot operate correctly when the code contained in the signal from the main unit 1 of the security device fails to coincide with the code resident in the code setting portion 12 of the audio device 3.

As has been described, the anti-theft system of the described embodiment disables the audio device 3 from operating in the event of an unauthorized use of the audio device 3, by making use of the remote control 2 which is a part of the security system.

The code which is resident in the main unit 1 of the security device, i.e., the code which is to be compared with the code transmitted from the remote controller 2, may be the same as the code which is sent from the main unit 1, i.e., the code resident in the code setting portion 12 of the audio device 3 or, alternatively, different codes may be used for the code matching between the remote control 2 and the main unit 1 and between the main unit 1 and the audio device 3.

In the preferred embodiment, the codes are set in units 6, 10, and 12 when the system is manufactured; in an alternative embodiment the code for at least code setting portion 12 is user settable.

Figure 3:
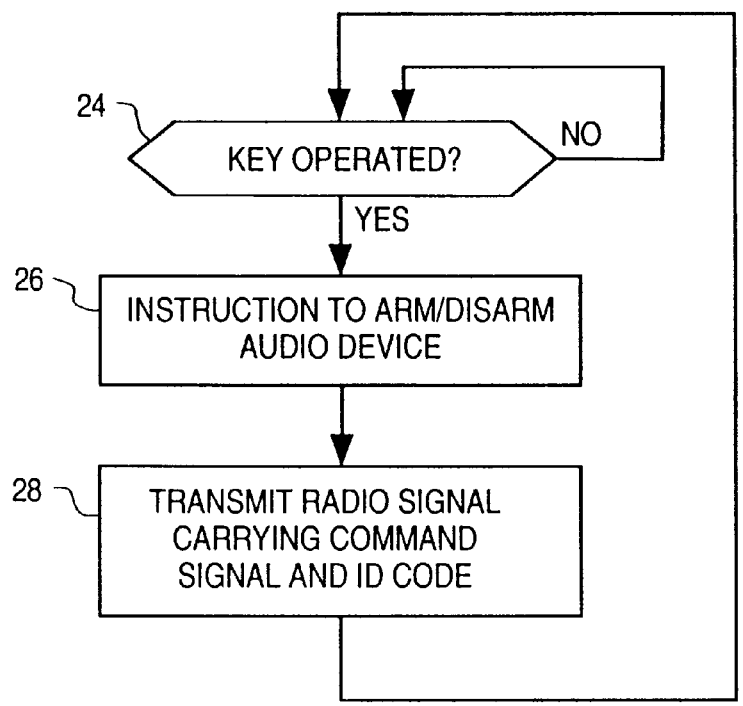
FIG. 3 shows a flow chart for the microprocessor in the remote control.

FIG. 3 shows a flow chart for a program conventionally resident in the microprocessor (i.e. microcontroller) 5 in the remote control unit 2. As seen in the first step 24, the program determines if a key, i.e. key 2a or 2b, has been operated. If not, then the program returns to the beginning. If the answer is yes, then an instruction, i.e., command, is given in step 26 to arm or disarm the audio device according to whether key 2a or 2b is pressed. In step 28 the program transmits the radio signal which carries the command signal and the I.D. code (stored in code setting portion 6) as described above.

Figure 4:
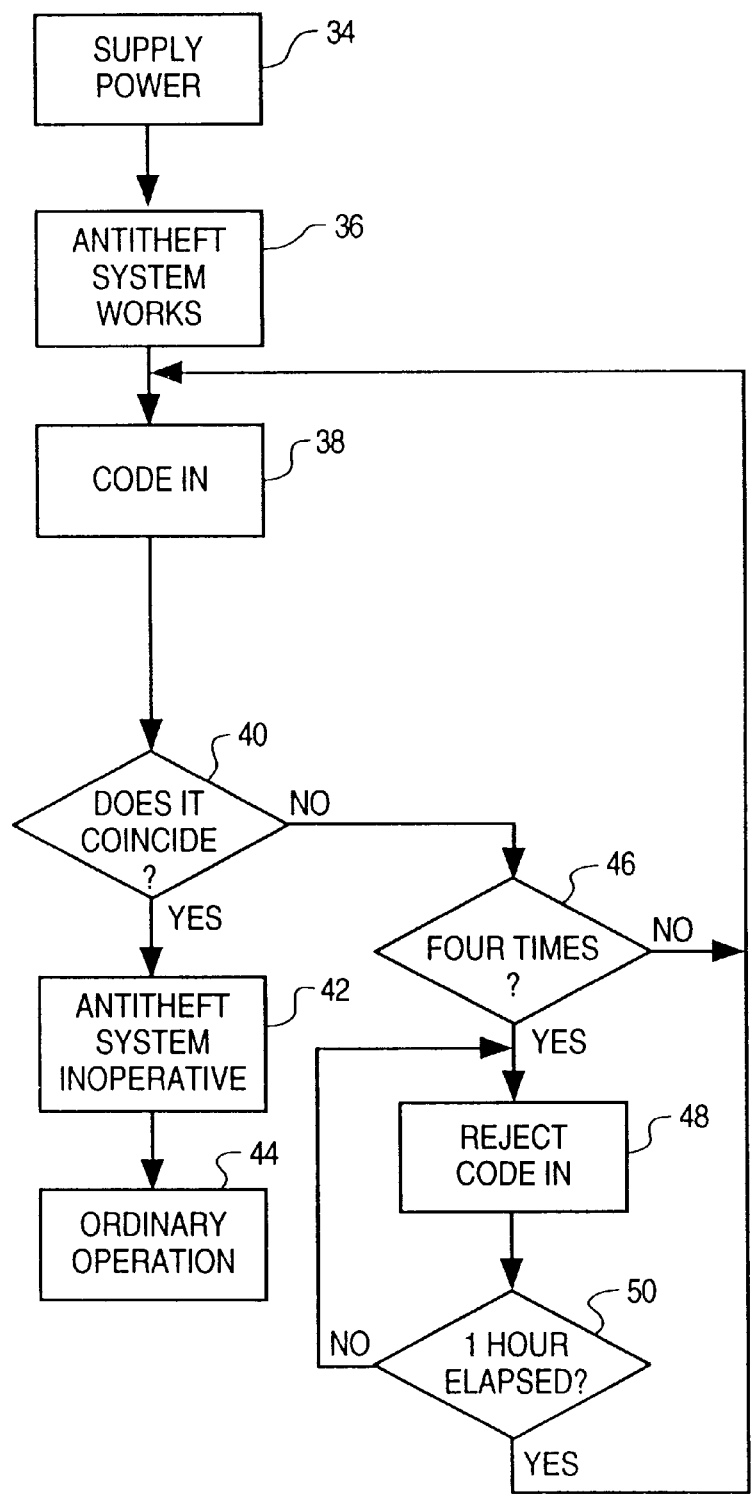
FIG. 4 shows a flow chart for the microprocessor in the accessory unit.

FIG. 4 shows a flow chart for the program conventionally resident in microprocessor 11 which is in the audio device 3. The program begins at step 34 where power is supplied to the audio device 3 from the power supply 18. Then the anti-theft system is enabled at step 36. Then in step 38 a code is received by microprocessor 11 from microprocessor 9 in main unit 1. Then in step 40 it is determined if the code received in step 38 matches the code resident in code setting portion 12. If the codes do coincide, i.e., the answer is yes, then in step 42 the anti-theft system is rendered inoperative and then in step 44 ordinary (normal) operation of audio device 3 is permitted.

If the answer at step 40 is no, then the code matching step 40 is repeated in step 46 for instance three times to avoid possible errors. Thus until the step has been performed four times, control is returned to step 38. After four attempts as determined in step 46, it is clear that the codes do not coincide, i.e., the answer to step 46 is yes. Then in step 48 there is a rejection of any further attempt to key in the code from the remote unit 2. In the next step, step 50, it is determined if one hour has elapsed since the prior keying in attempt. If over one hour as elapsed, then control is returned to step 38 and it is permitted to attempt to key in a new code. If less than one hour has elapsed, then control is returned to step 48, i.e., further keying in is rejected. This is to prevent a thief from attempting to repeatedly key in numerous codes in an attempt to steal audio device 3. The one-hour waiting time is deemed adequate for this purpose in one embodiment of the invention.

Figure 5:
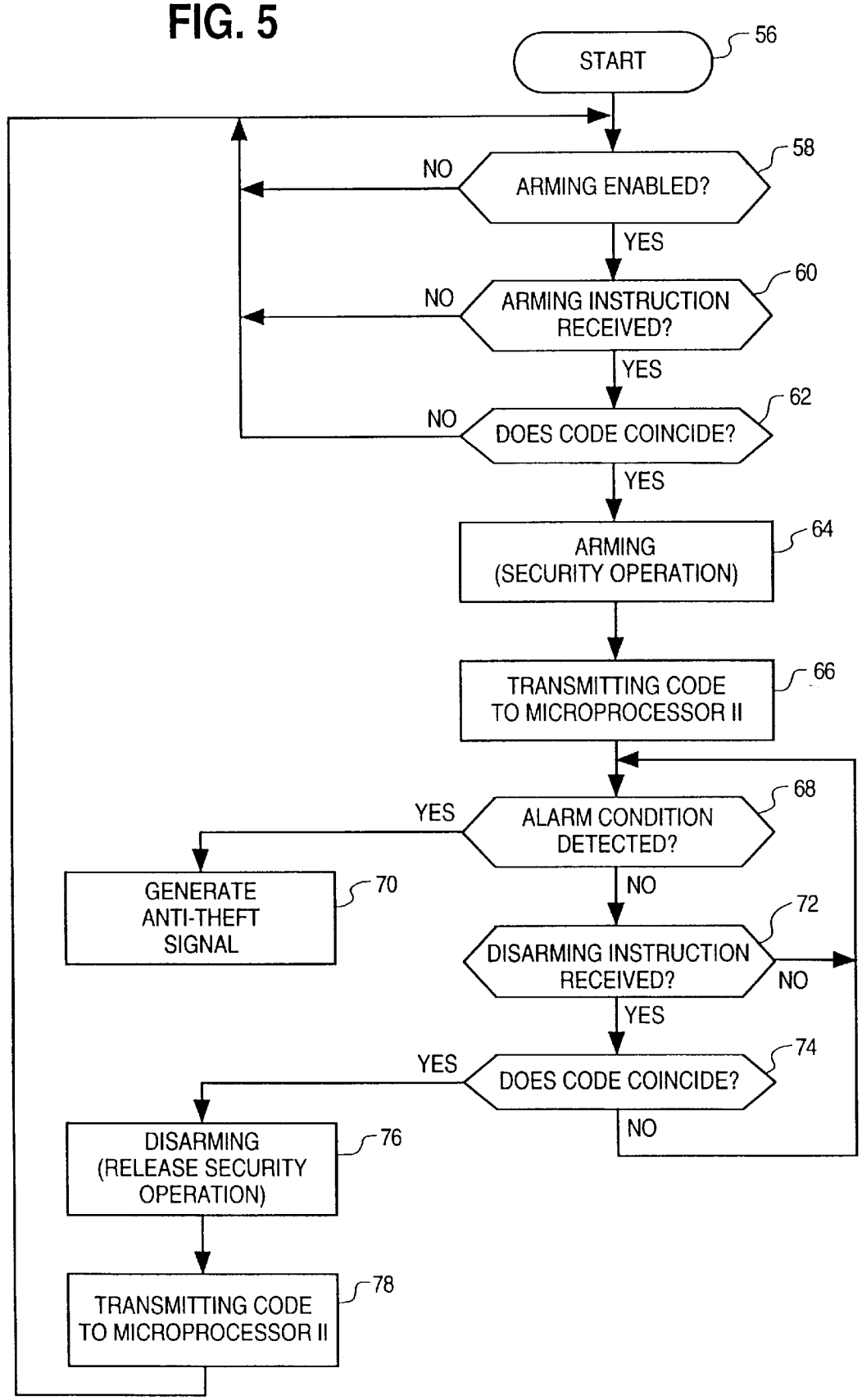
FIG. 5 shows a flow chart for the microprocessor in the main security device unit.

FIG. 5 shows a flow chart for the program conventionally resident in microprocessor 9 in the main unit 1. As can be seen, the program begins with step 56. Control is then transferred to step 58, at which it is determined if arming of the security system has been enabled. If arming has not been enabled, then control is returned to the start. If arming has been enabled, then it is determined in step 60 if an arming instruction has been received from the remote unit 2. If no arming instruction has been received, control is returned to the start. If the arming instruction has been received, then in step 62 it is determined if the code received from the remote unit 2, i.e., the code stored in code setting portion 6, coincides with the code resident in the main unit 1, i.e., the code stored in code setting portion 10. If the codes do not coincide, then control is returned to the start. If the code does coincide in step 62, then arming (the initiation of the security operation) takes place in step 64. Next, in step 66, a code is transmitted from microprocessor 9 to microprocessor 11 in the audio device 3.

In the next step 68, it is determined if an alarm condition is detected by sensor 15. If an alarm condition is detected, i.e., some sort of unauthorized intrusion or interference with the system, then in step 70 the anti-theft signal is generated by microprocessor 9 setting off siren 16. In the normal state in step 68 there is no alarm condition detected and control passes to step 72, where it is determined if a disarming instruction has been received from remote unit 2. If no such disarming instruction is received, then control is returned to condition 68, i.e., the system remains armed. If in step 72 the disarming instruction been received, then control passes to step 74, at which it is determined if the received code from the remote unit 2 matches the code resident in code stored portion 10. If the codes do not coincide, control is returned to step 68. If the answer to step 74 is yes, i.e., the codes do coincide, then control is transferred to step 76 where disarming takes place, i.e., the system is no longer in the security state. Then in the next step 78, a code is transmitted from microprocessor 9 to microprocessor 11 in the audio device 3. Then control is returned again to the start at step 56.

As will be understood from the foregoing description, the anti-theft system of the present invention includes the electronic accessory itself and the security device including a remote control unit. Thus, the automotive electronic accessory such as an automotive audio device cannot be used by itself. This advantageously eliminates the motivation of a thief to steal the electronic accessory and, hence, discourages theft. Furthermore, the owner can use the electronic accessory without difficulty and without remembering a code, since the electronic accessory can be enabled through the security system by a remote control by operating a single key once.

Although the invention has been described in its preferred form, it is to be understood that the described embodiment is only illustrative and various changes and modifications may be imparted thereto without departing from the scope of the invention which is limited solely by the appended claims.

What is claimed is:

1. An anti-theft system for a vehicle comprising:

a portable remote control unit responsive to actuation of buttons thereon for transmitting a radio frequency signal including a first identification code;

a security unit fixedly mounted on the vehicle, the security unit including a receiver for receiving the radio frequency signal, a first memory for storing a second identification code, and a first processor for comparing the received first identification code with the second identification code and for generating a third identification code when the first identification code coincides with the second identification code; and an electronic audio device removably mounted on the vehicle and connectable to the security unit, the electronic audio device including a second memory for storing a fourth identification code and an audio signal generator for transmitting audio signals to an output device, the electronic audio device including a second processor for comparing the third identification code with a fourth identification code and enabling the audio signal generator only when the third identification code coincides with the fourth identification code.

2. A system as in claim 1, wherein the radio frequency signal including both the first identification code and a command code.

3. A system as in claim 2, wherein the first identification code and a command code transmitted in the radio frequency signal are stored in a third memory located on the remote control unit.

4. A system as in claim 3, wherein the first identification code is user-settable.

* * * * *